Dec. 11, 1928.
J. W. HANSES
1,695,096
VEHICLE TOWING DEVICE
Filed May 23, 1927
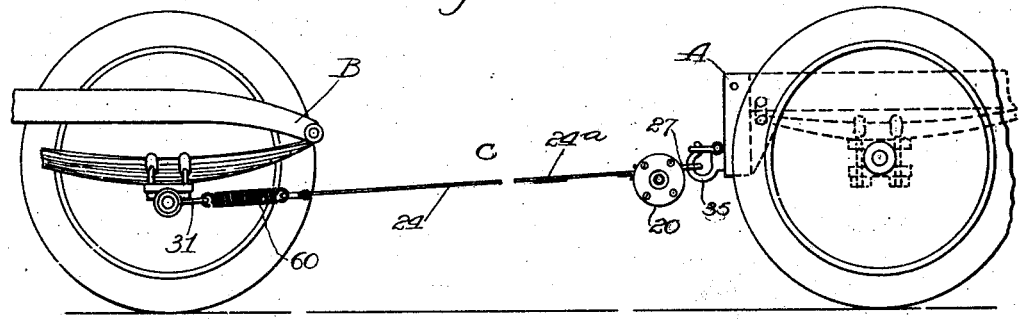
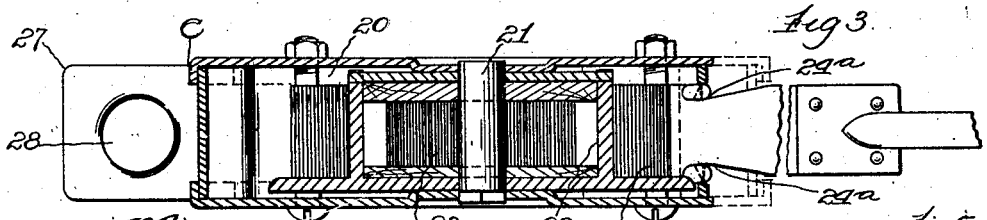
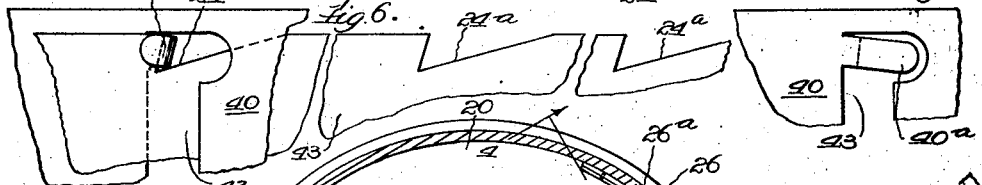
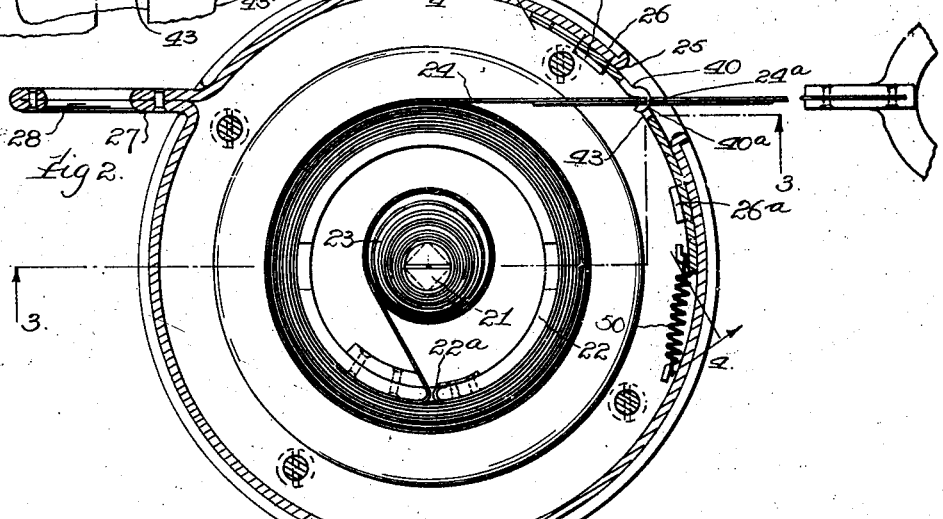
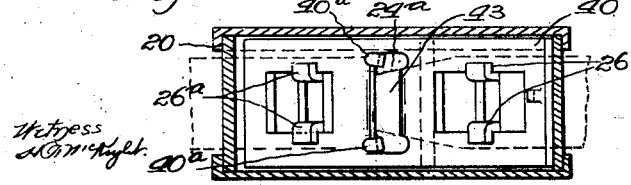
Inventor.
John W. Hanses.
by Burton Burton
his Attorneys.

Patented Dec. 11, 1928.

1,695,096

UNITED STATES PATENT OFFICE.

JOHN W. HANSES, OF CHICAGO, ILLINOIS.

VEHICLE TOWING DEVICE.

Application filed May 23, 1927. Serial No. 193,401.

The purpose of this construction is to provide an improved device of the nature of a towing line by which one vehicle may be attached to another to be towed thereby. It consists in the elements and features of construction shown and described as indicated in the claims.

In the drawings:—

Figure 1 is a diagrammatic view showing a towing device embodying this invention, connecting two vehicles.

Figure 2 is a transaxial section of the towing shaft winding or take-up device.

Figure 3 is a section at the line 3—3 on Figure 2.

Figure 4 is a section at the line 4—4 on Figure 2.

Figure 5 is a detail plan view of a portion of the blank from which the towing strap is formed at the part which forms the catch nose of the detent.

Figure 6 is a detail view showing the detent with its catch nose engaged with the towing strap.

In the drawings A represents the towing vehicle or tractor; B the vehicle to be towed. C indicates in its entirety the device embodying the invention. This device comprises a casing, 20, which is desirably, as shown, substantially cylindrical in form; a rigid post or stud, 21, mounted fixedly at the center of the casing; a hollow spool, 22, mounted rotatably on the stud, 21; a retracting spring, 23, coiled within the hollow spool having its inner end secured to the post and its outer end secured to the spool. 24 indicates the towing strap which is a flat steel strap of some resiliency, but quite flexible, which is adapted to be wound on the spool, 22, and for that purpose has one end engaged with the spool as by having said end hooked and entered in a notch, 22$^a$, in the spool periphery, the other end of the strap being adapted to extend out through an aperture, 25, in the periphery, 26, of the casing and having at its end outside the casing any convenient means for attaching it to the vehicle to be towed, said means being indicated conventionally by the cable, 31, which may be tied or otherwise secured, to some part of either the towing or the towed vehicle. The purpose and intent of the spring, 23, is merely to automatically rewind or coil upon the spool the flat towing strap, 24, when the device is not in use for towing, and when, therefore, there is no stress upon the strap so that when thus rewound it constitutes a series or succession of quite loose coils which tend to expand resiliently to the limit of the interior capacity of the casing. When the towing strap is withdrawn for service and is operating for towing, it is of course stretched taut from the point at which it runs off the spool tangent to the inner coils, if any, remaining on the spool, and thence emerges through the aperture, 25, in the periphery of the casing. And since it is not intended that the stress of towing shall be exerted upon the securement of the towing strap to the spool, because that would have too great a tendency to rupture the strap or tear it from the spool, there is provided as a means for taking the stress of towing and transmitting the same to the towing vehicle, a detent member, 40, which is mounted, preferably with limited range of movement on the casing, 20, proximate to the aperture, 25, through which the towing strap emerges; and it may be either inside or outside the casing, but as shown it is inside the casing. For engaging this detent, the towing strap is provided at least at one point suitably near its inner end to permit the maximum available length of the strap to be withdrawn for attaching to the vehicle to be towed at a convenient distance from the towing vehicle, with notches, 24$^a$, 24$^a$, in its opposite edges and preferably directly opposite each other, adapted to be engaged by the teeth, 40$^a$, 40$^a$, of the detent, 40, mounted upon the casing as described, proximate to the aperture, 25, said notches having each an abrupt shoulder facing away from the point of securement of the strap to the spool, so that the stress upon the strap when it is attached and operating in towing service, is directed through said abrupt shoulders against the detent and transmitted through the detent to the casing and thence to the towing vehicle, avoiding the liability of tearing the strap from the spool or rupturing it at its point of attachment to the spool as would be likely to occur in the absence of any other provision for taking the strain at some point antecedent to the attachment of the spool.

The casing, 20, is formed with a lug extending from its periphery as shown at 27 adapted for pivotally connecting the casing to the vehicle, said lug being apertured for attaching it by any suitable means as a snap hook, 35, to the frame of the vehicle to which the device is to be mounted for its service; and it will be understood that when the device is in service and the towing strap is under stress for drawing the load to which the device is attached, the line of stress is from the pivotal connection of the casing directly to the point of engagement of the detent, 40, with the abrupt shoulders of the towing strap; and the strap being attached to the spool intermediate between these two points between which the stress is exerted, it may be seen that in order to avoid more or less abrupt flexure of the towing strap at the point of its engagement with the detent, 40, it is desirable that the point from which the strap runs off tangentially from the spool shall be in a direct line between the point of the pivotal attachment of the casing to the vehicle and the point of engagement by the detent, 40; and for this purpose the lug, 27, by which the casing is attached to the vehicle has an eye, 28, at which it is thus pivotally attached, and the detent, 40, is mounted in the casing as more particularly hereinafter described with its engaging teeth, 40ª, 40ª, in a line tangent to the coil of the towing strap on the spool at the point at which the strap runs therefrom for extending out through the aperture, 25, in the periphery of the casing at or approximate to which it is engaged with the detent.

In order that the device may be employed with a greater or less length of towing strap extending from vehicle to vehicle, the strap may be provided at a plurality of points in its length with abrupt shoulder-forming features such as the notches, 24ª, 24ª, the portion of the strap anterior to the particular pair of notches which are engaged with the detent being, of course, wound on the spool. And since the winding of a greater or less amount of the strap on the spindle varies the diameter of the coil at the point at which the strap runs therefrom to the casing aperture, in order to make the line of stress from the pivotal attachment of the casing to the vehicle to the point of engagement of the detent with the strap tangent to the coil of the strap on the spool at the point at which the strap runs therefrom, whether more or less of the strap is wound on the spool, it is necessary to provide for the detent automatically shifting the point of the engagement of its teeth with the strap according to the diameter of the coil on the spool; and for this purpose the detent is formed and mounted for sliding on the inner side of the peripheral member, 26, of the casing, staples, 26ª, 26ª, being struck inwardly from said peripheral member for seating the detent and guiding it in a limited range of sliding, and a spring, 50, is provided for retracting it to one limit. Said detent has an aperture, 43, through which the towing strap, 24, emerges from within the casing and extends out through the casing aperture, 25, the detent teeth, 40ª, being struck and folded from said detent, 40, into position for engaging simultaneously the notches, 24ª, of the towing strap, 24. The aperture, 43, is dimensioned and positioned relatively to the detent teeth, 40ª, so that the swing or other position-changing movement of the towing strap due to the greater or less amount of the latter which is wound on the spool as the less or greater portion is withdrawn for engagement of the detent with notches more remote or nearer to the spool-attached end slides the detent in the staples, 26ª, keeping the detent teeth engaged with the strap while the strap is stressed in direct line, without bending at the point of engagement of the detent, the aperture, 25, in the casing being wider than the aperture, 43, in the detent, to accommodate the varying direction in which the strap may be thus stressed.

As illustrated, the casing is connected to either of the connected vehicles by means of an interposed shock absorbing coil spring, 60, according to the common practice for absorbing the shock of starting the vehicle after taking up the slack, thereby diminishing the liability to rupturing the towing strap at starting or at any occurrence of slack followed by taking up of the slack in the process of towing.

By reference to Figures 5 and 6 it will be understood that the detent teeth are folded so as to present the face for encounter with the oblique edge of the notches, 24ª, of the towing strap inclined obliquely with respect both to the length and to the width of the strap, so that upon the encounter with the oblique edges of the notches, the detent will ride upon the strap without tendency to change the strap crosswise between the teeth of the detent.

I claim:—

1. A vehicle towing device comprising in combination, a casing adapted to be attached to one of the vehicles; a stud fixed in the casing, a hollow spool mounted rotatably on the stud; a spring coiled in the spool cavity secured at its inner end to the stud and at the outer end to the spool, whereby it is adapted to be coiled by the rotation of the spool in one direction and to react for rotating the spool in the opposite direction; a flexible metal towing strap adapted to be coiled on the spool and having the inner end secured thereto for being so coiled by the rotation of the spool in said opposite direction, the outer end of the strap being extended out through the periphery of the casing, and means carried by said outer end for engaging the other vehicle.

2. In the construction defined in claim 1, a detent member positioned within the casing, the towing strap having at a selected point in its length an abrupt shoulder-forming feature for engaging the detent, said detent member being secured to the casing wall and said abrupt shoulder of the strap facing away from the spool-attached end of the strap.

3. In the construction defined in claim 1, said strap having at a selected position an abrupt shoulder-forming feature of which the abrupt shoulder faces outwardly with respect to the secured end, and a detent mounted upon the peripheral wall of the casing for engaging said abrupt shoulder when the strap has beeen withdrawn for uncoiling the portion thereof extending outwardly from said shoulder.

4. In the construction defined in claim 1, the shoulder having an abrupt shoulder-forming feature at a selected position in its length, and a detent adapted for engaging said shoulder mounted on the peripheral wall of the casing for projecting transversely to the path of the towing strap from coiling to the point of its emergence from the casing, and adapted to contact the surface of the strap and engage said abrupt shoulder.

5. In the construction defined in claim 1, the strap being reinforced at a selected part of its length, having in said reinforced part an abrupt shoulder-forming feature of which the shoulder faces outwardly from the inner secured end of the strap; and a detent device mounted at the casing aperture having a projection for engaging said shoulder in the withdrawal and uncoiling of the strap.

6. In the construction defined in claim 1, the strap having at a selected position in its opposite longitudinal edges respectively, notches forming abrupt inwardly-facing shoulders, and a detent mounted proximate to the casing aperture comprising projections adapted to engage said notches respectively as the strap is withdrawn and uncoiled.

7. In the construction defined in claim 1, the casing having means of attaching it pivotally to one of the vehicles to be connected, and a detent member positioned within the casing adapted for selective engagement with the strap, the pivot of the casing and the point of engagement of the detent being in a line tangent to the coil of the towing strap on the spool at the point at which the strap runs from the spool to the casing aperture.

8. In the construction defined in claim 1, the towing strap having an abrupt shoulder-forming feature of which the shoulder faces away from the point of attachment of the strap to the spool, and a detent mounted on the casing for engaging said abrupt shoulder proximate to the casing aperture through which the towing strap extends therefrom, the casing having means for attaching it pivotally to one of the vehicles to be connected, said pivot and the point of engagement of the detent being in line tangent to the coil of the towing strap on the spool at the point at which it runs therefrom to the casing aperture.

9. In the construction defined in claim 1, the towing strap having an abrupt shoulder-forming feature of which the shoulder faces away from the point of securement of the strap to the spool, a detent member mounted for circumferential sliding on the peripheral wall of the casing and having an aperture dimensioned for emergence therethrough of the towing strap, said detent member having a projection for engaging the towing strap protruding in said aperture transversely to the face of the strap, the strap being cut away at a selected point in its length and at a suitable part of its width for engagement of said detent projection as the towing strap is uncoiled from the spool and withdrawn from the casing, the casing aperture being dimensioned circumferentially of the casing in excess of the corresponding dimension of the aperture in the detent for accommodating the sliding movement of the detent due to the varying direction of stress of the towin line.

JOHN W. HANSES.